INVENTOR.
FRED B. NELSON,
BY Charles E. Lightfoot
ATTORNEY.

Nov. 5, 1968  F. B. NELSON  3,409,037
PRESSURE RELIEF OR FLOW CONTROL VALVE
Filed July 30, 1965  4 Sheets-Sheet 2
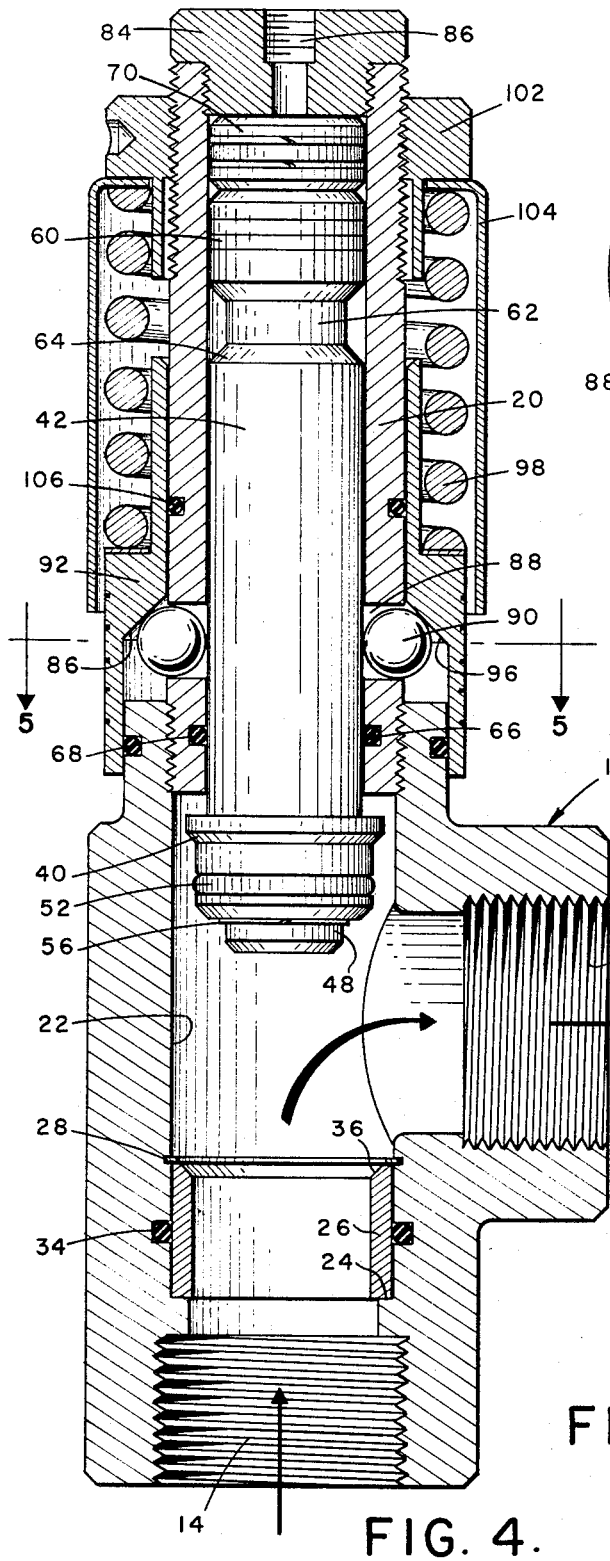
FIG. 4.
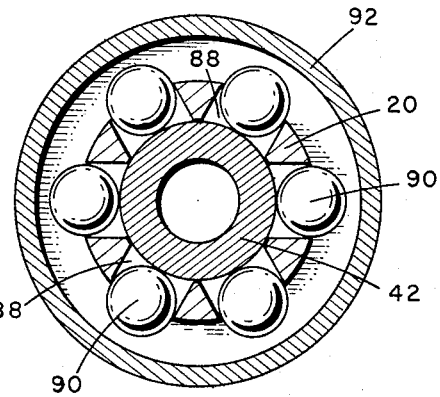
FIG. 5.
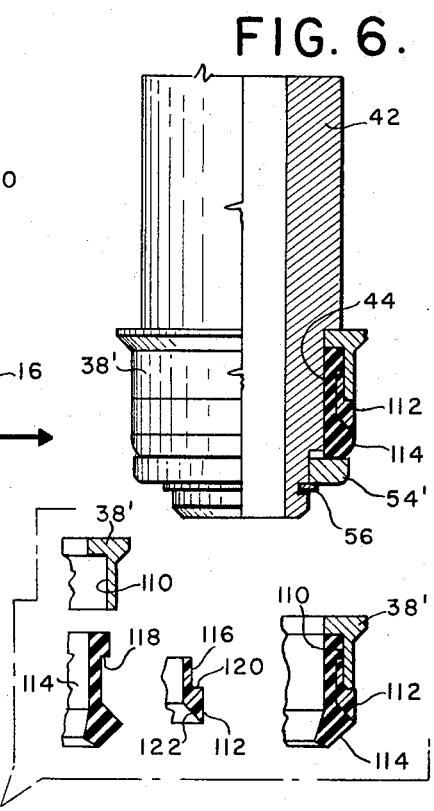
FIG. 6.
FIG. 7.
INVENTOR.
FRED B. NELSON,
BY Charles E. Lightfoot
ATTORNEY.

Nov. 5, 1968  F. B. NELSON  3,409,037
PRESSURE RELIEF OR FLOW CONTROL VALVE
Filed July 30, 1965  4 Sheets-Sheet 4

INVENTOR.
FRED B. NELSON
BY
Charles E. Lightfoot
ATTORNEY.

United States Patent Office 3,409,037
Patented Nov. 5, 1968

3,409,037
PRESSURE RELIEF OR FLOW CONTROL VALVE
Fred B. Nelson, P.O. Box 51987, Lafayette, La. 70501
Filed July 30, 1965, Ser. No. 475,928
2 Claims. (Cl. 137—514.7)

ABSTRACT OF THE DISCLOSURE

A pressure relief valve mechanism in which the valve is opened by inlet pressure and has means for yieldingly resisting opening movement of the valve until the inlet pressure reaches a predetermined value, after which the valve opens with a snapping action. The invention also embodies means for applying a closing force to the valve by fluid pressure from a source other than the source whose flow is controlled by the valve. The means for yieldingly resisting opening movement of the valve may include spring means and differential areas of the valve exposed to pressure tending to move the valve toward open position. Means may also be provided, located for operation exteriorly of the valve housing for varying the resistance of the yieldable means to opening the valve, whereby the opening pressure of the valve may be regulated.

---

This invention relates to valve mechanism of the flow control or pressure relief valve type which is constructed to open under the influence of a predetermined pressure of fluid and to remain open until a force is applied to force the valve back into a closed position when the pressure of the fluid falls below such predetermined pressure.

The invention is capable of use for a number of different purposes where it is desired to prevent the pressure from exceeding a predetermined value, and finds particular utility in connection with apparatus in which the flow of fluid is to be controlled by allowing the fluid to flow when the pressure reaches a predetermined value and to shut off the flow when the pressure falls below a predetermined value.

The invention has for an important object the provision of valve mechanism which may be adjusted to open at a predetermined pressure and having means whereby the range between the pressure at which the valve opens and the pressure at which closing of the valve takes place may be varied within wide limits.

Another object of the invention is the provision of valve mechanism which may be operated to open at a predetermined pressure and which may be closed by the application of pressure from an external source.

Another object of the invention is to provide valve mechanism in which the valve opening and closing mechanism is enclosed and protected against the effect of weather or the entrance of foreign matter.

A further object of the invention is the provision in a valve of the kind mentioned of seal forming means which is designed to perform a wiping action on the valve upon opening or closing movement of the valve and which may move longitudinally in contact with the valve to prevent the element from sticking to the valve.

Another object of the invention is to provide seal forming means of the type referred to which is formed of a material whose coefficient or friction is such that the frictional resistance to movement of the valve is substantially the same when the valve is closed as the resistance to such movement when the valve is moving in contact with the seal forming means.

The above and other obvious advantages of the invention may best be understood from the following detailed description, constituting a specification of the invention when considered with the annexed drawings, wherein FIGURE 1 is a longitudinal, central, cross-sectional view illustrating a preferred embodiment of the valve mechanism of the invention, and showing the valve in closed position;

FIGURE 4 is a view similar to that of FIGURE 1, showing the valve in open position;

FIGURE 5 is a cross-sectional view, taken along the line 5—5 of FIGURE 4;

FIGURE 6 is a fragmentary, longitudinal cross-sectional view illustrating a somewhat modified form of the seal forming means of the valve;

FIGURE 7 is a fragmentary, cross-sectional view of the parts of the valve seating element and seal forming means of FIGURE 6, removed from the valve stem;

Figures 1, 2, 3:
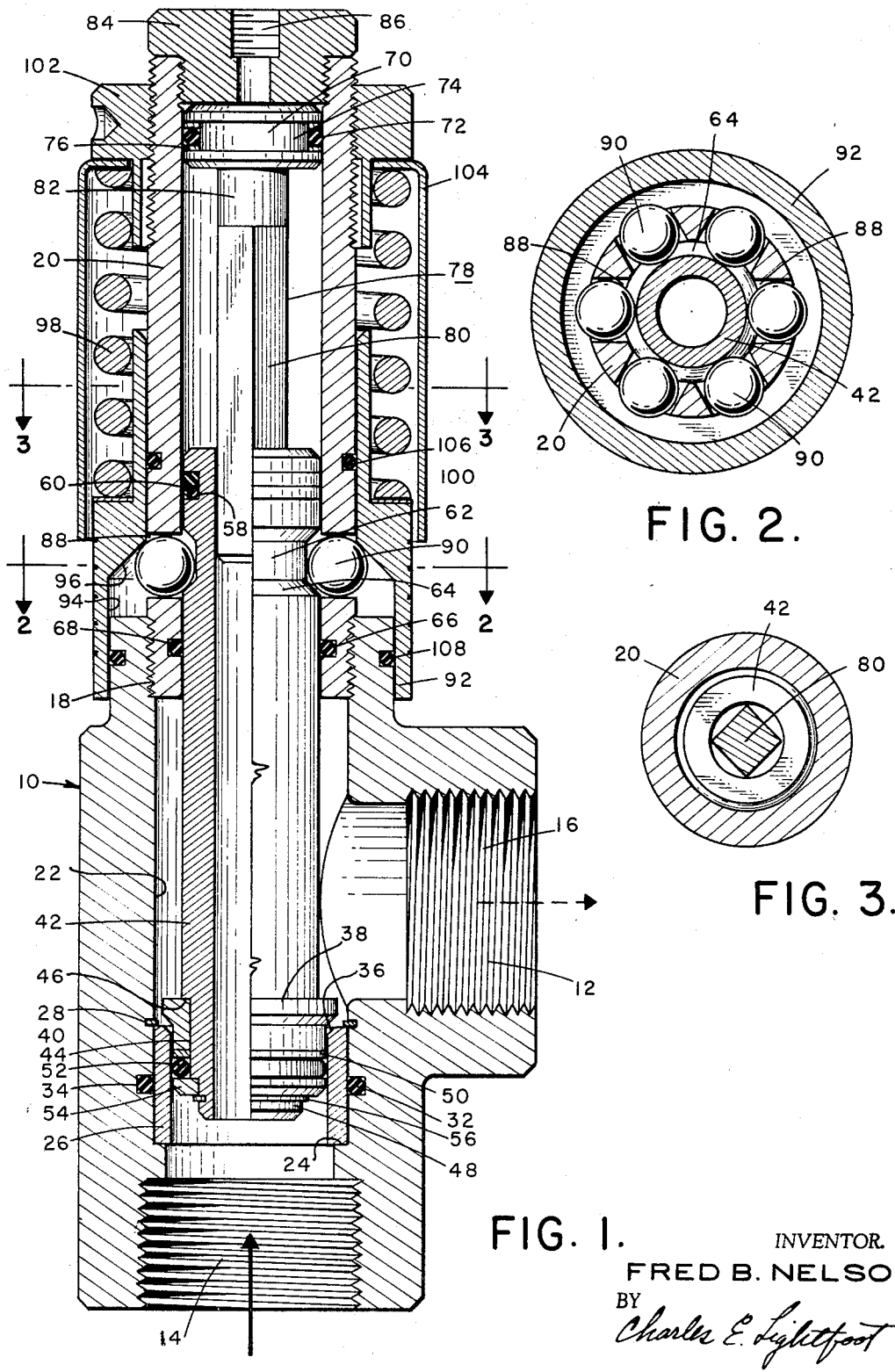
FIGURE 2 is a cross-sectional view, taken along the line 2—2 of FIGURE 1, looking in the direction indicated by the arrows.
FIGURE 3 is a cross-sectional view, taken along the line 3—3 of FIGURE 1, looking in the direction indicated by the arrows.
Figure 8:
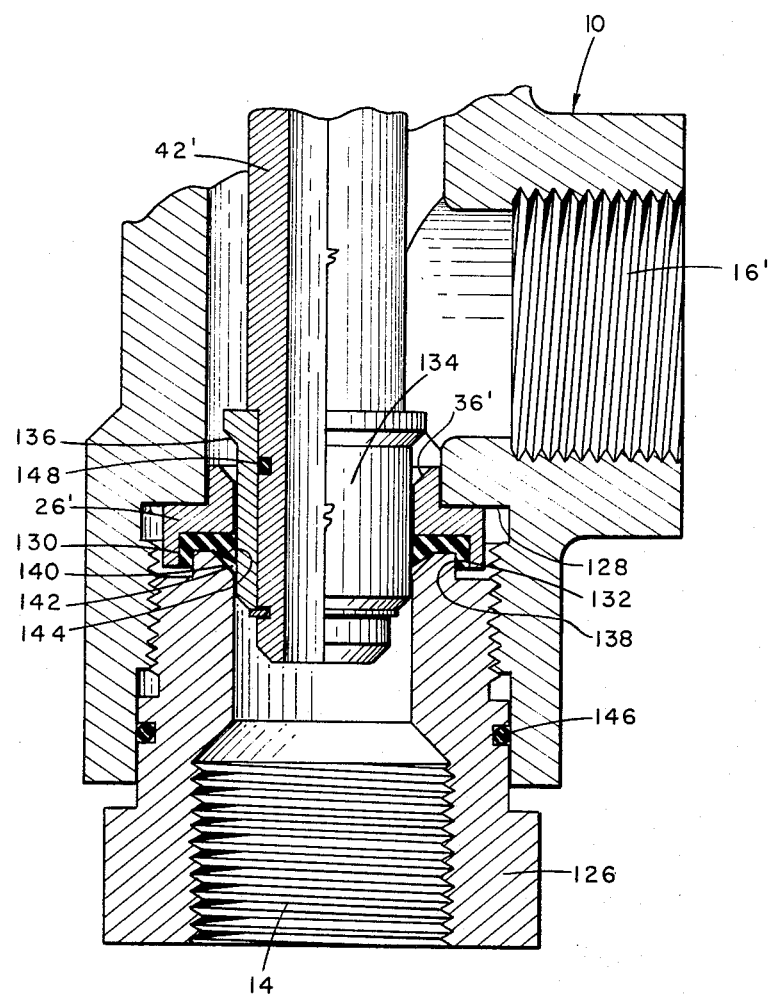
Figure 9:
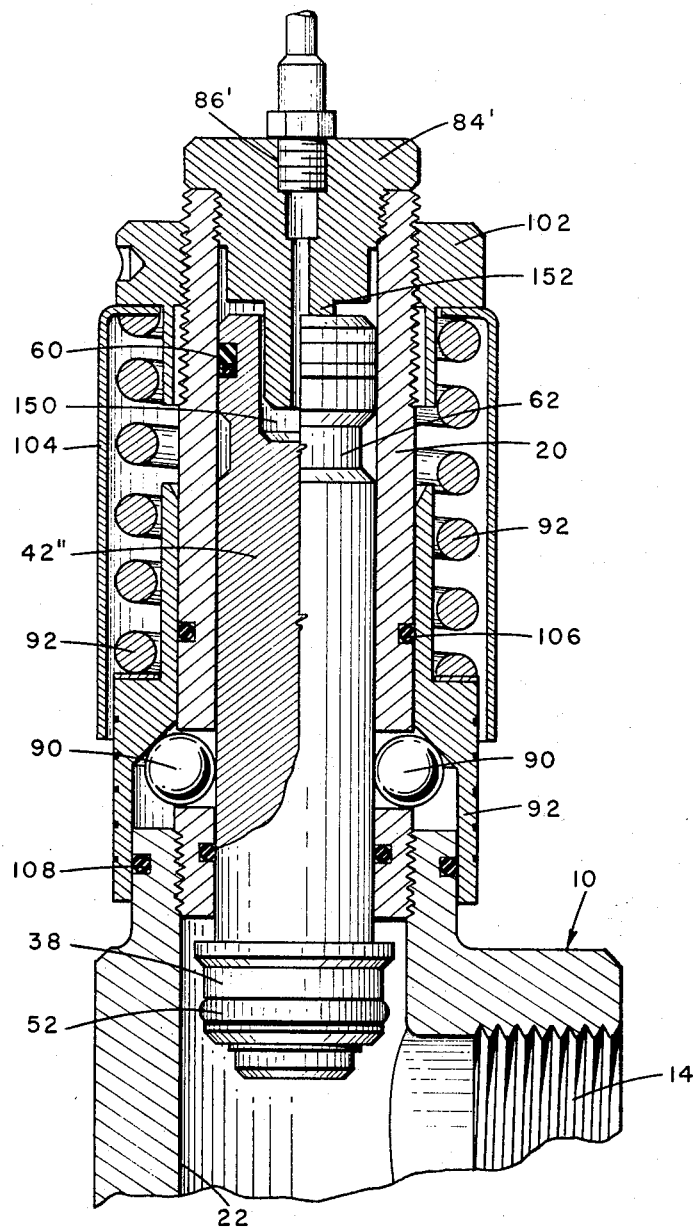

FIGURE 8 is a fragmentary view, similar to that of FIGURE 1, illustrating a modified form of the valve housing and the valve seat and seal forming means of the invention with the valve in closed position; and FIGURE 9, is a fragmentary view similar to that of FIGURE 1, illustrating a further modified form of the invention in which the valve and valve stem are of solid construction rather than tubular.

Referring now to the drawings in greater detail the valve mechanism of the invention, in the present illustration, includes a valve casing or housing, generally indicated at 10, formed with a flowway 12 having internally threaded inlet and outlet openings 14 and 16, respectively. The housing 10 is also provided with an internally threaded opening 18, in communication with the flowway 12, to which a tubular control bonnet 20 is threadably connected at its lower end.

The housing 10 has an internal counterbore 22 whose inner end terminates in an internal, annular shoulder 24 upon which an annular seat forming element 26 is seated at its lower end, which may be retained in place by suitable means, such as a snap ring 28 releasably fitted into an internal annular groove provided for the same in the housing. Suitable seal forming means may be provided such as the O-ring 32 surrounding and in sealing contact with the seat forming element 26 in an internal groove 34 for the same. The seat forming element has at its inner end an internal, inwardly tapering, end surface forming a valve seat 36.

A valve, or seating element, generally designated 38, is movably disposed in the housing for longitudinal movement into and out of closing relation to the seat element 26 and including an annular valve element formed with an external, annular, bevelled seating surface 40 positioned to shoulder on the seat 36 when the valve is fully closed. The seating element is carried on a tubular valve stem 42, extending upwardly in the housing and slidably extended into the bonnet 20. The valve stem is formed adjacent its lower end with the portion 44 of reduced diameter, forming a downwardly facing annular shoulder 46 against which the annular element 38 is seated in surrounding relation to the portion 44, and also has an end portion 48 below the portion 44 which is of further reduced diameter. A back-up ring 50 surrounds the portion 44 below the element 38 against which suitable seal forming means, such as an O-ring 52 is positioned about the portion 44, and below the ring 52 a retainer ring 54 is disposed about the reduced portion 48, the assembly being retained on the stem by an external snap-ring 56 seated in an external groove in the stem.

Adjacent its upper end, the stem 42 has an external annular groove 58 in which suitable sealing means is disposed, such as that shown at 60, and below the groove 58, the stem has an external groove 62 formed with inwardly converging side walls such as the wall 64 for a purpose to be explained hereinafter. Suitable seal forming means, such as the O-ring 66 surrounds the stem 42 in an internal, annular groove 68 provided for the same in the lower end portion of the bonnet 20.

A valve resetting piston 70 is movably disposed in the bonnet above the upper end of the stem 42, which piston is provided with piston ring means which may take the form of an O-ring 72 in an external annular groove 74 and suitable back-up rings therefore, such as those seen at 76. The piston 70 has a downwardly extending rod or shaft 78, which is slidably extended into the upper end of the stem 42, and which has a portion 80 to provide one or more passageways 81 through which fluid may pass to equalize the pressure at the opposite ends of the stem, and a portion 82, above the portion 80 which is shaped to closely fit within the upper end of the stem 42 to serve as a dashpot arrangement to cushion the impact between the stem and the resetting piston 70.

The bonnet 20 has at its upper end a screw plug or closure 84, which is provided with an internally threaded passageway 86, which may be connected in communication with any suitable source of fluid under pressure for actuation of the resetting piston 70.

The bonnet 20 is provided, near its lower end with side openings 88 within which suitable detent means such as the balls 90 are movably disposed, the balls being of a size to extend inwardly beyond the bonnet into the groove 62 of the stem 42 to hold the stem against longitudinal movement in the bonnet in a direction to open the valve.

The balls 90 are yieldingly urged inwardly in the openings 88 by a retaining sleeve 92 surrounding and longitudinally slidable on the bonnet 20 and which is formed with an enlarged counterbore 94 at its lower end, into which the upper end of the housing 10 is slidably fitted, and whose bottom wall 96 is bevelled to form a longitudinally inwardly tapered annular surface for engagement with the balls 90. The retainer sleeve 92 is yieldingly urged in a direction to yieldingly hold the balls 90 against movement radially outwardly in the openings 88, as by means of a coil spring 98 whose lower end rests on an external annular shoulder 100 formed on the sleeve and whose upper end bears against an adjusting nut 102 threaded on the upper end of the bonnet. An outer hood 104 covers the spring 98 and extends downwardly past the shoulder 100 to protect the spring. Suitable seal forming means, such as the O-rings 106 and 108 are provided between the sleeve and bonnet and between the sleeve and the housing 10 to exclude water and foreign material from the interior of the mechanism.

The balls 90 working in the openings 88 of the bonnet for coaction with the stem 42 in the groove 62 thereof, together with the spring 98 and sleeve 92 form latching mechanism for releasably holding the valve in closed position and to allow the valve to snap into open position when the pressure in the inlet 14 exceeds a predetermined value.

In the operation of the valve, the inlet 14 and outlet 16 are connected into a flow line through which the flow of fluid is to be controlled, and the connection 86 is connected to a suitable source of fluid under pressure which may be under the control of any suitable valve means, not shown, whereby the pressure in the bonnet above the resetting piston 70 may be controlled. With the valve thus connected, and the valve in its closed position, as shown in FIGURE 1, will be apparent that when the pressure in the inlet 14 reaches a predetermined value the valve will be opened against the resistance of the spring 98. Upon opening movement of the valve the stem 42 will be moved upwardly, so that the balls 90 will be forced outwardly in the openings 88 by engagement with the tapered side walls 64 of the groove 62 of the stem, to move the sleeve 92 upwardly against the pressure of the spring 98, thus releasing the stem, whereupon the valve will move to fully open position with a snapping action.

By constructing the valve so that a longer upward movement of the stem 20 is required to move the seal forming means of the valve out of the seat forming element 26, than the upward movement which is necessary to unlatch the ball and groove latching mechanism as described above, the valve may be made to remain closed until the latching mechanism is released, and then to open suddenly.

Prior to such opening movement of the valve the resetting piston will be held in the position of FIGURE 1 by the pressure of fluid in the inlet 14, there being no pressure in the bonnet 20 above the resetting piston at this time, and during opening movement of the valve the stem 42 will move upwardly freely throughout the extent of the portion 80 of the shaft 78 until the upper end of the stem reaches the portion 82 thereof, whereupon further upward movement of the stem will be checked by the dashpot action of the portion 82 entering the upper end of the stem, to cushion impact of the stem against the piston 70.

The valve may be closed by introducing fluid under pressure through the passageway 86 to force the resetting piston 70 and the stem 42 therewith downwardly until the valve is seated in the seat forming member 26, whereupon the balls 90 will be moved into the groove 62 of stem 42 to yieldingly hold the valve against opening movement.

It will be apparent that the opening force exerted on the valve will be determined by the difference in the area of the valve and the area of the upper end of the stem 42 against which the pressure of the fluid is exerted, and that the structure may be made to provide any such difference in area which may be desired. Thus, the internal diameter of the seat forming element and the external diameter of the valve element 38 may be varied to provide a desired area against which upward pressure of the fluid in the inlet 14 will be exerted and the spring 98 may also be adjusted by means of the nut 102 to vary the opening pressure of the valve throughout a pretermined range and this range may be altered by substituting different sizes of springs.

The force required to cause unlatching of the latching mechanism may also be varied by changing the angle of the side wall 64 of the groove 62 of the valve stem 20 relative to the longitudinal axis of the stem, and the bottom wall 96 in the counterbore 94 of the sleeve 92 may also be varied for the same purpose.

By suitably adjusting the pressure of fluid applied to the resetting piston 70 through the passageway 86, the closing force exerted on the valve may also be varied so that the valve may be held closed by fluid pressure or may be closed under the influence of a predetermined pressure.

The area upon which pressure will be exerted on the resetting piston is the same on both sides of the piston, so that the resetting piston will be moved to and held in its uppermost position whenever the pressure beneath the resetting piston exceeds the pressure applied thereto through the passageway 86.

A somewhat different form of the valve is illustrated in FIGURES 6 and 7, wherein the valve seating element 38' of the assembly is formed with an internal counterbore 110 within which the upper portion of seal forming elements 112 and 114 are disposed. The seal forming element 112 is preferably formed of suitable material, such as Teflon, or the like, having a very low coefficient of friction, and is shaped to provide a reduced portion 116 extending into the valve element 38' and whose inner end engages an external shoulder 118 formed on the element 114. Below the reduced portion 116 the element 112 has a portion 120 which is in abutment with the lower end of the valve element 38' below which the element 112 has an outer cylindrical face positioned for sealing engagement with the internal face of the seat forming element 26 when the valve is closed. The element 112 also has a bevelled, internal, annular, end face 122 positioned for engagement with an external bevelled face on the lower portion of the element 114, which is formed of a suitable resilient material such as rubber, to yieldingly urge the element 112 into sealing engagement with the surrounding internal surface of the seat forming element 26 when the valve is closed. The elements 112 and 114 are held in place in the assembly by a retainer ring 54' which in turn is held in place by a snap ring 56', as in the form of the invention previously described, as in connection with FIGURES 1 and 4.

As seen in FIGURE 6 when the parts are assembled, the portion 44 of stem 42 will hold the lower portion of the element 114 in an outwardly expanded position against the internal bevelled face 122 of the element 112 to yieldingly urge the element 112 into sealing engagement with the valve seating element 26.

In this form of the valve sealing means it will be apparent that the outer annular face of the lower portion of the Teflon element 112 will be sealingly engaged with the inner surface of the seat forming element 26, and due to the low coefficient of friction of such material, there will be no substantial resistance presented by such engagement to the movement of the valve while at the same time a fluid tight seal will be maintained when the valve is closed.

A modified form of the valve and sealing means therefor is shown in FIGURE 8, wherein the inlet 14' of the housing 10' is formed by a separate plug-like member 126 which is threadably inserted into the lower end of the valve housing. The housing 10' has an internal annular shoulder 128, against which an annular seat forming element 26' is seated, which element has an internal bevelled seat 36' at its upper end an enlarged counterbore 130 in its lower end, within which an annular seal forming element 132 is disposed for surrounding sealing contact with a somewhat elongated valve seating element 134 similar to the valve element 38 previously described, having an external, annular, bevelled face 136, similar to the face 40, for engagement with the seat 36'.

The element 132 has a lower counterbore 138 shaped to fit over the inner end of the member 126, which is extended into the element in engagement therewith to securely clamp the element between the member 126 and the seat forming element 26'. The inner end of the member 126 has an internal, annular, bevelled end face 140, which forms the lower wall of an annular, inwardly opening cavity 142, and the element 132 has an inner marginal portion 144 which is of somewhat wedge shape in cross-section, extending into the cavity and whose inner annular face is positioned for sealing contact with the external annular face of the valve element 134 when the valve is closed. The portion 144 of the element 132 is of substantially smaller size than the cavity 142, so that this portion may move slightly longitudinally relative to the seat forming element 26' when the valve 134 moves longitudinally in contact with the element 132 to perform a wiping action on the valve. The element 132 is preferably formed of Teflon or some similar material having a low coefficient of friction, so that there will be no tendency for the seal forming element to stick to the valve and there will be no substantial resistance to opening or closing movement of the valve presented thereby.

Suitable seal forming means, such as the O-ring 146 may be provided between the valve housing 10' and the member 126 in the lower end of the housing and similar sealing means 148 may be provided between the valve 134 and the stem 42'.

The operation of this modified form of the invention is the same as that described in connection with the form illustrated in FIGURES 1 and 4, the valve 134 being of slightly less external diameter than the internal diameter of the seal forming member 26' to allow the valve to move freely in the member and the sealing element 132 having a close fit with the external face of the valve to provide a fluid tight seal therewith.

A further modified form of the invention is shown in FIGURE 9, wherein the valve stem 42" is of solid construction rather than being tubular as shown in the previously described forms.

In this modification of the invention the solid stem 42" is formed at its upper end with an end counterbore 150, and the closure 84' is formed with an inner end portion 152 which fits into the counterbore to provide a dash pot to cushion the upward movement of the stem when the valve reaches its open position.

It will be appreciated the structure of the invention may be modified within the scope of the appended claims.

Having thus clearly shown and described the invention, what is claimed as new and desired to secure by Letters Patent, is:

1. Pressure relief valve mechanism comprising a housing having a fluid inlet and a fluid outlet and a portion forming an inside cylinder in axial alignment with and opening into the interior of the housing in spaced relation to the inlet, a valve movably disposed in the housing for sliding movement in the cylinder into and out of closing relation to the inlet, means forming a seal between the valve and cylinder, means for conducting fluid from the inlet into the cylinder at a location to expose the valve to pressure tending to resist opening movement of the valve, pressure fluid means movably disposed in the cylinder and in the valve in position to be urged away from the valve under the influence of the pressure of fluid on the valve and means for introducing pressure fluid into the cylinder at a location to urge said pressure fluid means toward the valve.

2. Pressure relief valve mechanism comprising a housing having a fluid inlet and a fluid outlet and a portion forming an inside cylinder in axial alignment with and opening into the interior of the housing in spaced relation to the inlet, a valve movably disposed in the housing for sliding movement in the cylinder into and out of closing relation to the inlet, a tubular stem on the valve slidably extended into said cylinder and through which fluid may flow from the inlet side of the valve into the cylinder, means forming a seal between the stem and cylinder, the cross-sectional area of the valve exposed to pressure tending to open the valve being greater than the cross-sectional area of the stem exposed to pressure tending to close the valve, piston means movably disposed in the cylinder and in the stem exposed to the pressure of fluid on the valve to urge the piston means away from the valve and means for introducing fluid under pressure into the cylinder at a location to urge the piston means toward the valve.

References Cited

UNITED STATES PATENTS

| | | | |
|---|---|---|---|
| 419,447 | 1/1890 | Hussey | 137—514.7 |
| 2,243,711 | 5/1941 | Lamb | 137—538 X |
| 1,787,602 | 1/1931 | Sweet | 188—88.509 X |
| 2,087,503 | 7/1937 | Clemmons | 137—216 X |
| 2,323,021 | 6/1943 | Ernst | 137—514.5 X |
| 2,643,675 | 6/1953 | Symmons | 137—609 X |
| 2,644,480 | 7/1953 | Earle et al. | 137—529 X |
| 3,174,500 | 3/1965 | Johnson et al. | 251—297 X |
| 3,229,971 | 1/1966 | Stretch et al. | 188—88.509 X |

WILLIAM F. O'DEA, *Primary Examiner.*

D. H. LAMBERT, *Assistant Examiner.*